United States Patent [19]

Garcea et al.

[11] 4,304,203
[45] Dec. 8, 1981

[54] DEVICE FOR REFINING THE ADJUSTMENT OF THE IGNITION ADVANCE OF A CONTROLLED-IGNITION INTERNAL COMBUSTION ENGINE

[75] Inventors: Giampaolo Garcea; Edoardo Rogora, both of Milan, Italy

[73] Assignee: Alfa Romeo S.p.A., Milan, Italy

[21] Appl. No.: 70,352

[22] Filed: Aug. 28, 1979

[30] Foreign Application Priority Data

Sep. 5, 1978 [IT] Italy ................................ 27319 A/78

[51] Int. Cl.³ ............................................. F02P 5/14
[52] U.S. Cl. .................................... 123/416; 123/425
[58] Field of Search ............... 123/425, 435, 415, 416, 123/406; 73/35

[56] References Cited

U.S. PATENT DOCUMENTS

| | | | |
|---|---|---|---|
| 3,526,124 | 9/1970 | Wostl | 73/35 |
| 3,875,912 | 4/1975 | Bullo | 123/425 |
| 4,063,538 | 12/1977 | Powell et al. | 123/425 |
| 4,130,097 | 12/1978 | Ford | 123/425 |
| 4,211,194 | 7/1980 | Hattori et al. | 123/425 |
| 4,216,750 | 8/1980 | Kobayashi | 123/435 |

*Primary Examiner*—Charles J. Myhre
*Assistant Examiner*—Andrew M. Dolinar
*Attorney, Agent, or Firm*—Charles E. Brown

[57] ABSTRACT

A device is disclosed for refining the adjustment of the angle of ignition advance in an internal combustion engine.

The angles of rotation of the crankshaft relative to the top dead center of an engine cylinder, relative to the start of ignition and the completion of combustion are detected electronically and signals are processed which are expressive of the magnitudes of said angles: these magnitudes are compared in a comparison circuit which is calibrated according to an optimum preselected ratio between the two angles. The electronic comparison circuit is capable of commanding the controlled-ignition system of the engine so as to modify the angle of advance of ignition continually, keeping it constantly to the desired optimum value.

7 Claims, 4 Drawing Figures

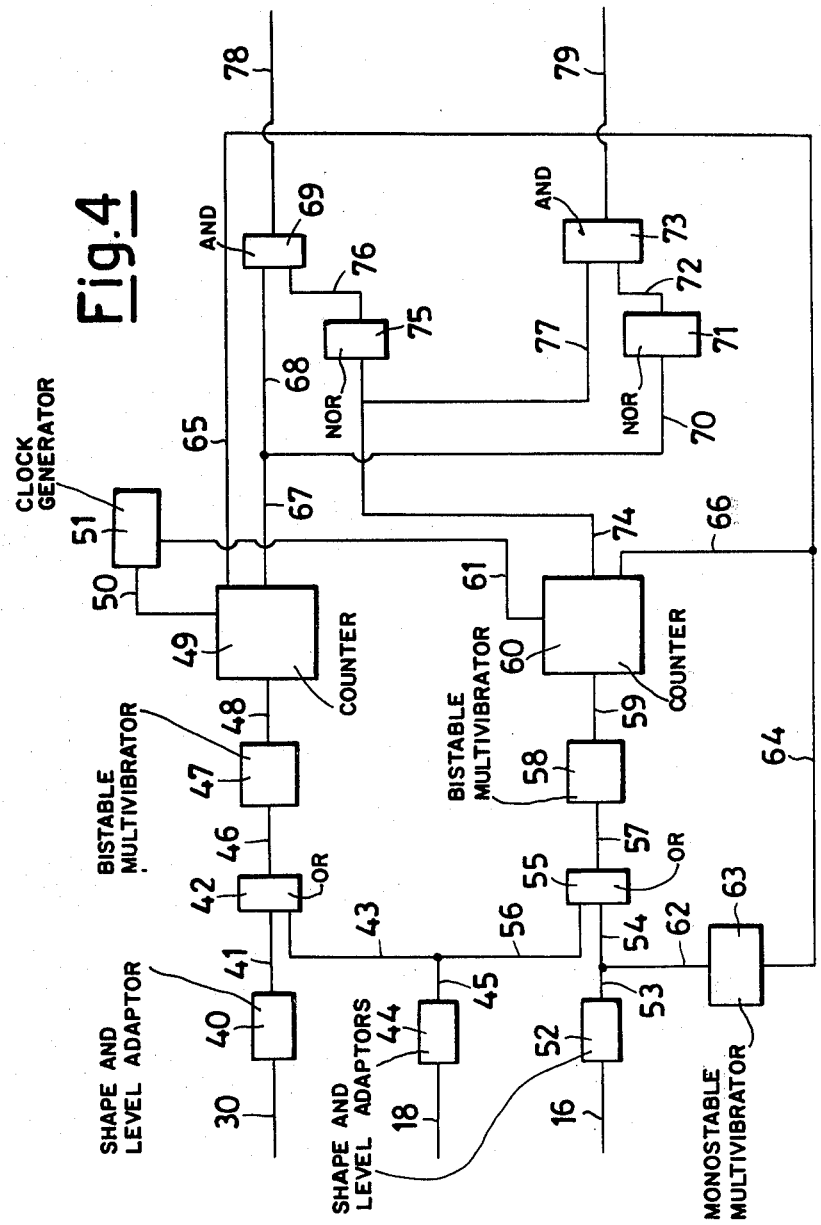

DEVICE FOR REFINING THE ADJUSTMENT OF THE IGNITION ADVANCE OF A CONTROLLED-IGNITION INTERNAL COMBUSTION ENGINE

As is known, in the theoretical thermal cycle of the Otto type, it is assumed that the combustion of the mixture takes place instantaneously as the piston is at the top dead center between the compression stroke and the beginning of the expansion stroke. In practice, in the usual explosion engines, defined as controlled-ignition internal combustion engines, the theoretical cycle aforementioned is altered due to a number of reasons: one of these is that the mixture requires a certain time for being burned completely. During this period of time the mainshaft is rotated through an angle which is the greater the higher is the rotation speed defined in terms of RPM. If in such usual engines ignition should occur at the end of the compression, that is when the piston is at its top dead center, the combustion would be completed (and thus the gases would receive all the thermal power set free by the combustion) when the piston has already made a considerable fraction of its expansion stroke; in the remaining fraction of such a stroke, only a comparatively reduced fraction of the overall thermal energy set free during combustion in the form of pressural power would be exploited. The advisability of an ignition advance is a result, so that the mixture must be ignited before the piston reaches its top dead center, that is, when the crankshaft must still go through a certain rotation angle (defined just as the advance angle, or merely advance) before the piston reaches the top dead center,.

On the basis of the foregoing, the angle of advance influences the efficiency of the engine principally in two ways, viz.:

(a) During the last part of the compression stroke, the mixture has a portion yet to be burned due to the effect of the ignition advance, defined as the angle alpha through which the engine crankshaft is rotated as from the beginning of the combustion to the top dead center position of the piston: the temperature increase originated by such combustion causes a pressure increase in the gas in the cylinder. Thus, the mechanical work of the compression stroke, which is a negative work, is increased. (b) Due to the effect of the ignition advance angle alpha the complete combustion occurs when the piston has gone through a small fraction only of the expansion stroke and this a small fraction corresponds to a crankshaft rotational angle beta through which the crank has been rotated from the position corresponding to the top dead center of the piston to the instant of time of the complete combustion. Thus, by virtue of the advance a more complete exploitation of the thermal power set free by the combustion is achieved and the mechanical work of the expansion stroke, which is a positive work, is improved. Inasmuch as by increasing the ignition advance angle alpha the negative effect (a) (increase of the power delivered for the compression) is increased, and by decreasing the angle alpha the negative effect (b) becomes more significant (defective exploitation of the thermal power during the expansion stroke), intermediate values of the advance angle alpha are the most advantageous: among these values, it is possible to find an optimum value, even though the efficiency curve as a function of the angle of advance is comparatively flat in the neighborhood of the aforesaid optimum value.

From the foregoing, the conclusion can be drawn that, very presumably, and in a first degree of approximation, the optimum ignition advance is that at which a determined constant (under all working conditions of the engine) optimum value is taken by the ratio $R = E_c:E_e$ between the thermal power $E_c$ impressed to the gases during the compression stroke and the power $E_e$ impressed to the gases during the expansion stroke. In a second approximation, the value of R, conversely, might vary somewhat as a function of one or more of the characteristic parameters of use of the engine (RPM, feeding pressure and others). Moreover, when bearing in mind the law, propagation of the flame front starting from the sparking plug in the interior of a combustion chamber has a certain outline, and thus the law according to which the combustion process is evolved, the conclusion has been reached that, with a similarly great probability, the ratio R, corresponding to the optimum ignition advance, is bound by a biunivocal relationship to the alpha/beta ratio, alpha and beta being the angles defined above. If, as outlined above, and in a first approximation the optimum advance angle is that for which there is always a constant optimum value of the ratio R, the optimum angle of advance is also the one at which there is always a constant optimum value of the ratio alpha/beta = K.

In a second approximation, conversely, the optimum angle of advance is the one at which the ratio alpha/beta takes a value, K, which varies somewhat as a function of one or more characteristic parameters of use of the engine.

With the above, and other objects in view that will hereinafter appear, the nature of the invention will be more clearly understood by reference to the following detailed description, the appended claims and the several views illustrated in the accompanying drawings.

FIG. 4 is a schematic of the electronic circuit of FIGS. 2 and 3.

Figure 1:
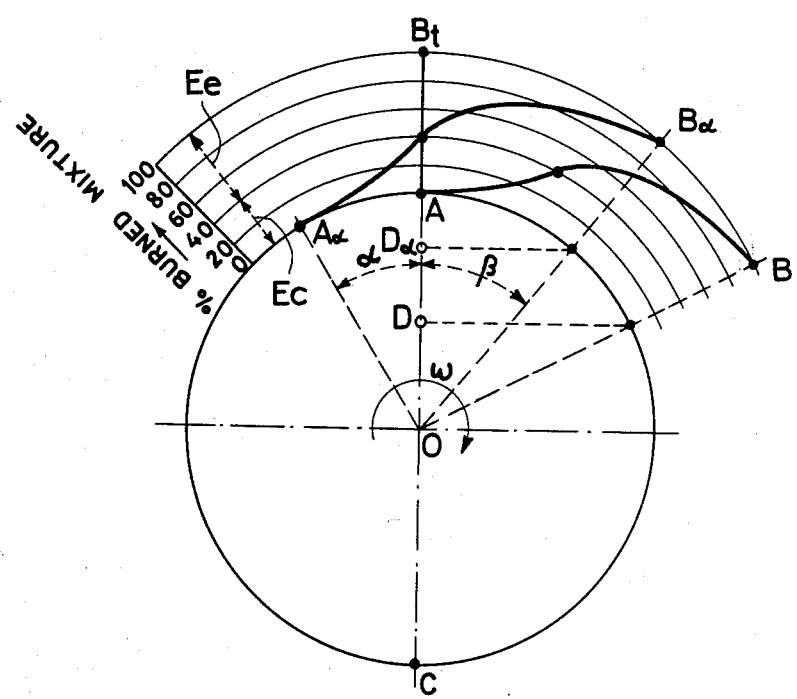
FIG. 1 is a graph plotting the combustion of the fuel-air mixture with respect to piston top dead center position with different ignition advance angles.

What has been said in the foregoing can further be elucidated with the aid of FIG. 1, which has been plotted on considering that the axis of rotation of the crankshaft is perpendicular to the plane of the sheet and intersects it in correspondence with the point O, and that the axis of one of the cylinders lies on the sheet plane and coincides with the straight line OA. If in FIG. 1 the length OA is the crank radius, the circle centered at 0 with the radius OA is the geometrical locus on the points through which the axis of the crank end passes when rotated about O in the sense of the arrow shown at $\omega$. Along the radii passing through said points (which correspond to the several positions of the crank end) there are plotted, starting from the circle having the radius OA, segments which are proportional to the percentage of the already burned mixture, on the basis of the scale which has also been reported on the drawing. The polar plot thus has the segment $AB_t$ representative of the instantaneous combustion in the ideal Otto cycle, which occurs in correspondence with the top dead center: before the point A the percentage of burned mixture is zero, immediately past A the mixture is burned 100%. The line A$\alpha$—B$\alpha$, instead relates to the combustion of an actual cycle in which the combustion starts at A$\alpha$, with an ignition advance of $\alpha$, and is completed at 100% at B$\alpha$, that is in correspondence with the angle $\beta$. Thus, a significant fraction of the expansion stroke AC, fraction shown at D$\alpha$A, is effected after that the combustion calories have been administered to the gases in their entirety. The line AB, instead, is representative of the actual combustion when the angle of advance, $\alpha$, is zero. The combustion starts with the piston at its dead center: only the reduced fraction DC of the stroke AC is effected after that all the combustion calories have been administered to the gases. The efficiency of a cycle corresponding to an angle $\alpha$ zero, thus certainly appears lower than that one would have with an angle $\alpha$ other than zero. The foregoing, however, does not show that, as $\alpha$ is increased, the efficiency rises to an optimum value whereafter it is decreased, nor does it show that said optimum values is obtained in correspondence with a value of the ratio $\alpha/\beta$ which is, in first approximation, constant as the use parameters of the engine are varied. In second approximation, the optimum value of $\alpha/\beta$ can vary somewhat as a function of one or more of said use parameter of the engine.

It has thus been envisaged to equip the engine with means which make possible a continuous readout, during operation, of the values of $\alpha$ and $\beta$, that is of the angles of rotation of the shaft relative to the dead center, in correspondence with which angles the combustion starts and is completed, respectively.

According to a first embodiment, which is valid in the case in which the combustion is started with a delay which is zero or is negligible over the instant of time of the electric discharge at the sparking plug, the value of $\alpha$ is taken as that corresponding to the beginning of the electric discharge, whereas the value of $\beta$ is detected with an ionization sensor arranged in the interior of the combustion chamber in that area, generally the farthest from the plug, at which the flame front arrives last, i.e. when the mixture has already been burned at 100%. The temperature increase due to the arrival of the flame front, in fact, intensely ionizes the gas and the corresponding sudden increase of the conductivity between the electrodes of the ionization sensor is just the signal which indicates the angle $\beta$.

In a second version, which is valid anyhow and thus also when a certain or a considerable delay of the combustion start over the start of the electric discharge exists, a second ionization sensor is provided, which is arranged in the combustion chamber in a position which is very close to sparking plug, and the increase of ionization in said second sensor originates the signal which defines the angle $\alpha$.

In both embodiments, provision is made so that the engine is equipped with a conventional ignition system which supplies the electric discharge at the sparking plug with an appropriate phasing angle, that is, with an appropriate angle of advance relative to the dead center, which corresponds to a conventional basic adjustment of the angle of advance as a function of at least one of the various parameters of use of the engine, such as RPM, feeding pressure and the like.

Provision is also made so that the engine is equipped with an electronic circuit which receives, for example, a phase signal relative to the engine crankshaft, and a signal indicative of the engine RPM. Such circuit receives at any rate the signals corresponding to $\alpha$ and $\beta$ according to the two embodiments referred to herein, or signals which enable said circuit to evaluate the values of $\alpha$ and $\beta$. Said electronic circuit, moreover, is equipped with means enabling it to compare the value of $\alpha$ with that of $\beta$ and to compare the value of the ratio $\alpha/\beta$ with a preselected value of K.

According to whether the ratio $\alpha/\beta$ is below, equal to, or above K, the circuit is capable of delivering a command that can be defined as a positive, a zero, or a negative command, respectively. Provision is also made so that the engine is equipped with a device, inserted between the electronic circuit and the ignition system, said device being capable of receiving such a positive (or negative) command and of causing, in its turn, a quick and gradual increase, or a quick and gradual decrease of the ignition advance, as supplied by said conventional basic adjustment of the ignition advance: thus a continuous corrective action may bring the ignition advance to the value at which the ratio $\alpha/\beta$ is the one which corresponds to the optimum engine efficiency. As further improvement, if the value of K corresponding to the optimum efficiency is not constant, but varies somewhat as a function of one or more of the characteristic operational parameters of the engine such as RPM, feeding pressure and others, provision is made so that signals relative to said one or more characteristic parameters may reach the electronic circuit aforesaid for varying the value of K relative to which the value of $\alpha/\beta$ must be compared.

Figure 2:
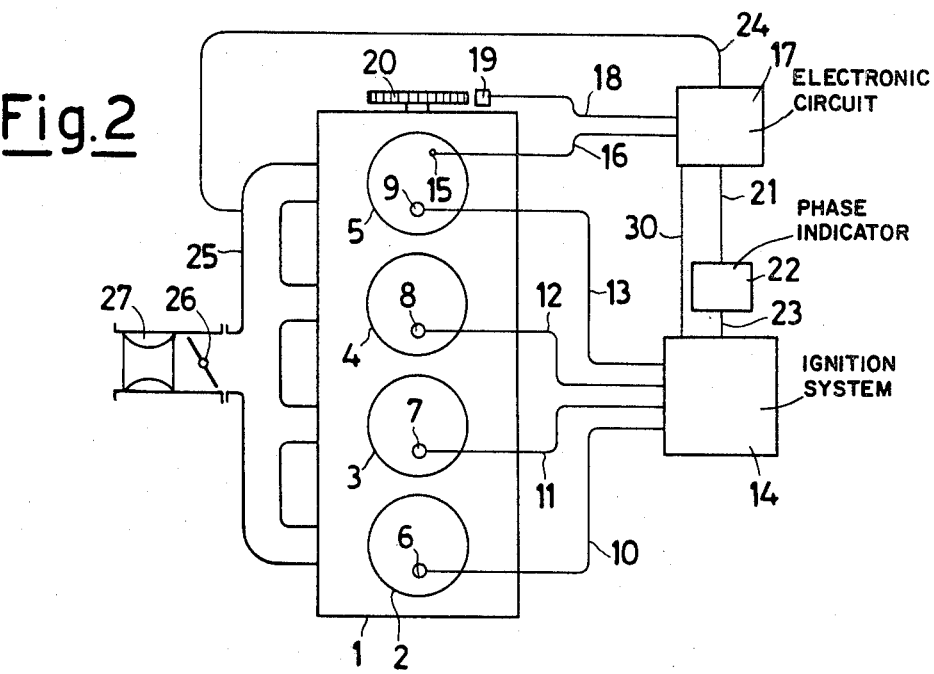
FIG. 2 is a schematic view of an internal combustion engine having an automatic ignition advance control in accordance with this invention.

In order to make the foregoing more conspicuous FIG. 2 shows by a mere way of example in a diagrammatical form and embodiment of the device according to the present invention: in that FIGURE, the reference numeral 1 indicates the bedplate of a 4-cylinder engine viewed along a direction parallel to the axes of the cylinders and 2, 3, 4 and 5 diagrammatically indicate the combustion chambers of the four cylinders and 6, 7, 8 and 9 the relative sparking plugs which are connected via the cables 10, 11, 12 and 13, with the ignition system 14. 15 indicates a sensor of ionization arranged in the interior of the combustion chamber 5 and in the farthest zone relative to the sparking plug 9, that is, the position at which the mixture is burned last. 16 is the connection of the sensor 15 with the electronic circuit 17 which is connected to the ignition system 14 via the line 30 which delivers to that system the signal of starting of the ignition of the spark plug 9 and is also connected via 18 to a sensor 19 for the phase signal and possibly of the crankshaft RPM, the shaft being terminated at the outside of the baseplate 1 by a possibly toothed wheel indicated at 20. The electronic circuit 17 is then connected with the connection 21 to the phase indicator device 22 which can be electronic or electromechanical, the device 22 being connected via the connection 23, of electric or mechanical type, to the ignition system 14 to vary the ignition angle of advance.

As outlined above, the electronic circuit 17 receives the signals for the evaluation of the angles $\alpha/\beta$ and the circuit in question can command, according to whether $\alpha/\beta$ is lower or higher than the preselected value K, by means of the device 22, the ignition system 14 for a quick and gradual increase of the ignition advance or a quick gradual decrease of said angle of advance.

The electronic circuit 17 can also feel, via the connection 24, the feeding pressure detected in the intake duct of the engine indicated at 25, downstream of the throttling butterfly 26 arranged in the carburettor 27. Thus the circuit 17 is possibly enabled to modify the value of K on the basis of the RPM parameter (by the agency of the connection 18) and the parameter feeding pressure (by the agency of the connection 24).

Figure 3:
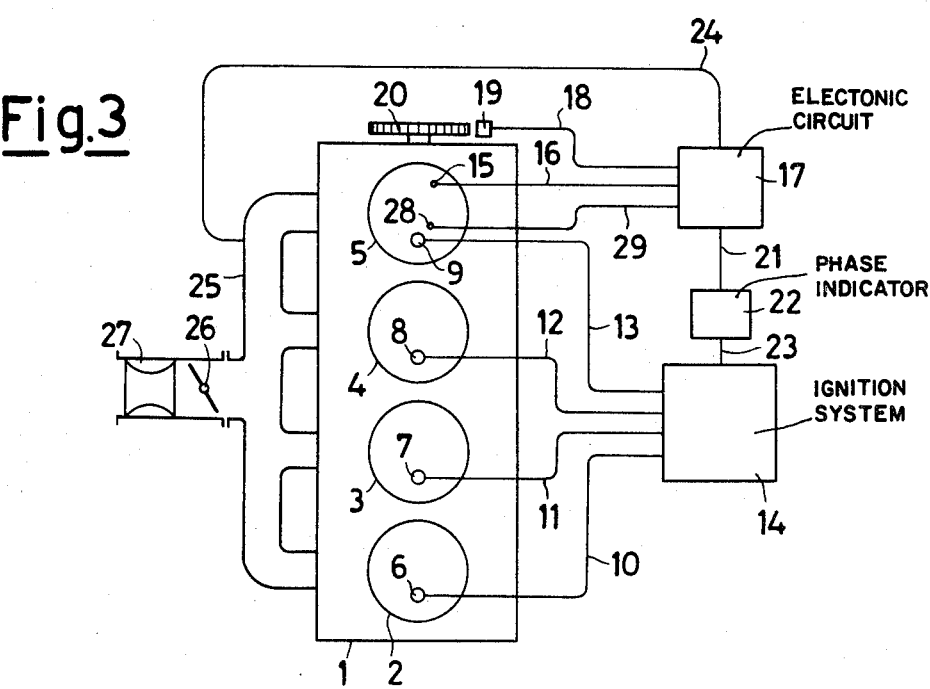
FIG. 3 is a schematic view similar to FIG. 2 but with a modified probe arrangement.

In FIG. 3 all the components diagrammatically indicated are the same as for FIG. 4, with the exception that in the combustion chamber 5 equipped with the sparking plug 9, there is, in addition to the sensor 15 and its connection 16, another ionization sensor 28 in a zone close to the sparking plug: the latter sensor, via the connection 29, delivers to the electronic circuit 17 the signal for evaluating the angle α corresponding to the beginning of the combustion.

FIG. 4 shows in a block diagram an example of practical embodiment of the electronic circuit indicated at 17 in FIGS. 2 and 3.

FIG. 4 shows the lines 16, 18, 30 indicated in FIG. 1 which deliver to the circuit 17 the signals to be processed. The ignition control signal that the circuit 14 sends to the sparking plug 9 and which flows through the line 30, is processed in the shape and level adaptor 40 and, via the line 41, reaches an input of the logical mismatching gate 42 (of the OR kind). The second input of the same logical gate 42 receives via the line 43 and the line 45 a second signal emerging from the shape and level adaptor 44 the input of which is connected to the line 18. The signal coming from the line 18 defines the instant of time at which the piston of the cylinder 5 is at its top dead center.

The output of the logical gate 42 is connected via the line 46 to the input of a bistable multivibrator indicated at 47 and the latter, via the line 48 is connected in its turn, to the incremental input of an increment and decrease counter 49. The counter 49, in its turn, receives, via the line 50 a train of constant-frequency pulses delivered by the clock-generator 51.

In the drawing, 52 indicates a shape and level adaptor connected to the line 16 and carrying the ionization signal delivered by the probe 15 of FIG. 2. Through the lines 53 and 54 the output of the adaptor 52 is connected to an input of the mismatching logical gate 55 (of the OR type), the second input of which receives, via the line 56, the top dead center signal supplied by the line 18.

The output of the logical gate 55 is connected via the line 57 to the bistable multivibrator 58, the output of which is connected via the line 59 to the input of a count-up and count-down counter indicated at 60. The counter 60 receives, via the line 61, a train of constant-frequency pulses delivered by the clock-generator 51.

From the line 53 the line 62 stems, which reaches the monostable multivibrator 63. The output of the monostable multivibrator 63 is connected through the lines 64 and 65 to the decrease input of the counter 49 and, via the line 66, to the decrease input of the counter 60.

The output of the counter 49 is connected via the lines 67 and 68 to an input of a logical gate indicated at 69 (of the AND type) and from the line 67 the line 70 stems, which, via the logical NOT gate 71 (adapted to convert a low voltage level into a high voltage, and viceversa) and the line 72, reaches an input of the logical gate indicated at 73 (of the AND type).

The output of the counter 60 is connected via the line 74, the logical gate 75 of the NOT type (adapted to convert a low voltage level into a high voltage level and viceversa) and the line 76 to the second input of the logical gate 69, and is also connected via the line 77, stemming from the line 74, to the second input of the logical gate 73.

The output of the logical gate 69, indicated at 78, and the output of the logical gate 73, indicated at 79, are connected to the line 21 shown in FIG. 2. The ignition signal of the spark plug, delivered by the line 30 to the count-up input of the counter 49 via the adaptor 40, the logical gate 42 and the bistable multivibrator 47, enables the counter 49 to start the count of the constant-frequency pulses that it receives from the line 50: the count-stop command is sent to the counter 49 by the line 18 via the adaptor 44, the logical gate 42 and the bistable multivibrator 47, whenever, through the same line 18, the signal flows which defines the instant of time at which the piston of the cylinder 5 is at its top dead center.

Thus the number of constant-frequency pulses summed up by the counter 49 in the time interval between the two signals, represents the angle α. The signal which defines the instant of time at which the piston of the cylinder 5 is at its top dead center is sent also by the line 18 to the count-up input of the counter 60 via the adaptor 44, the logical gate 55 and the bistable multivibrator 58: this signal enables the counter 60 to start the count of the constant frequency pulses it receives from the line 61: the command to stop the count is sent to the counter 60 by the line 16 via the adaptor 52, the logical gate 55 and the bistable multivibrator 58, whenever there flows in the same line 16 the ionization signal delivered by the probe 15 when the mixture which is present in the interior of the probe burns.

Thus the number of constant-frequency pulses totalled by the counter 60 in the time interval between the two signals represent the angle beta.

The ionization signal delivered by the probe 15 reaches also, via the line 62, the monostable multivibrator 63, the line 64 and the lines 65 and 66, the count-down inputs of the counters 49 and 60; said signal commands the two counters to count-down the pulses totalled by both counters until resetting. Once reset has been accomplished, a reset signal appears at the output of the counter concerned.

If the counter 49 is reset before the counter 60, at the output of counter 49 a signal appears, for example a high voltage level, whereas no signal appears at the output of the counter 60, for example there is a low voltage signal: by virtue of the connection provided for between the outputs of the counters and the logical gates 69 and 73, a signal then appears (a high voltage level) at the output 78 of the logical gate 69, whereas there is no signal (low voltage level) at the output 79 of the logical gate 73.

This fact means that the angle alpha is narrower than the angle beta so that, in the case in which the optimum K ratio between the two angles has been selected equal to 1, the signal at the output 78 will command the system 14 of FIG. 2 to widen the ignition advance angle.

When also the counter 60 is reset, the circuit is preset for the subsequent cycle of detection of the angles α and β.

If the counter 60 is reset before the counter 49, there appears on the output of 60 a signal, for example a high level signal, whereas no signal is present at the output of the counter 49, for example there is a low level, by virtue of the connection provided for between the outputs of the counters and the logical gates 69 and 73, there appears at the output 79 of the logical gate 73 a signal (a high voltage level) whereas there is no signal (low voltage level) at the output 78 of the logical gate 69.

This fact means that the angle beta is narrower than the angle alpha and thus, if the optimum K ratio between the two angles has been selected to be 1, the signal at the output 79 will command the system 14 of FIG. 2 to narrow the ignition advance angle, As also the counter 49 is reset, the circuit is preset for the subsequent cycle of detection of the angles $\alpha$ and $\beta$.

Should the counters 49 and 60 be reset simultaneously, the signal indicating such condition appear at the outputs of both counters, such as a signal of high voltage level on the line 67 and a signal of high voltage level on the line 74: the two signals, reaching the logical gates 69 and 73 via the connection which have been described, act in such a way that at the outputs of the same two gates, 78 and 79, respectively, no signal is present, that is a low voltage level.

The absence of signals at the outputs of the two logical gates 69 and 73 indicates that the two angles $\alpha$ and $\beta$ are equal and in the case that the optimum ratio K between the two has been selected equal to 1, it represents the correct run conditions so that no correction is required of the ignition advance as controlled by the system 14 of FIG. 2.

Of course, in the case of the device shown in FIG. 3, the shape and level adaptor 40 will be connected to the line 29 coming from the probe 28 rather than to the line 30 as shown in FIG. 4.

Using different frequencies for the two counters and thus two different constant-frequency pulse generators; it becomes possible to have the circuit of FIG. 4 operating with an optimum ratio K between $\alpha$ and $\beta$ other than 1.

We claim:

1. A device for regulating ignition advance of a controlled-ignition system internal combustion engine having a crankshaft, a plurality of cylinders each having a combustion chamber, a piston in each cylinder, and means for directing a combustible fuel-air mixture to said cylinders, said device comprising an electronic circuit, a first sensor means disposed in the combustion chamber of at least one cylinder and connected to said electronic circuit for producing a first start-of-combustion signal, a second sensor means for detecting the position of the piston of said one cylinder when at top dead center, said second sensor means being connected to said electronic circuit for providing a second signal, a third sensor means disposed in a zone very far from the said first sensor means inside the combustion chamber of the same cylinder and connected to said electronic circuit for producing a third end-of-combustion signal, first processing means for generating from said first and second signals a fourth signal corresponding to the angle $\alpha$ through which the crankshaft rotates from the moment of the start of combustion in said combustion chamber to the position corresponding to the top dead center of the piston in said one cylinder of the engine, and second processing means for generating from said second and third signals a fifth signal corresponding to the angle $\beta$ through which the crankshaft rotates from said top dead center position up to the moment when the combustion of the combustible mixture in said one cylinder is practically terminated; said electronic circuit comprising comparator means for comparing the signals corresponding to the angles $\alpha$ and $\beta$ to determine whether a $\alpha/\beta$ ratio is lesser or greater than a pre-established value K which corresponds to a preselected optimal ignition advance angle, said comparator means including means for sending positive or negative command signals to the engine ignition system for increasing or decreasing the ignition advance angle in accordance with the relation of the detected $\alpha/\beta$ ratio to the value K.

2. A device according to claim 1, characterized in that each cylinder has a spark plug and said first sensor means includes a sensor for detecting spark pulse supplied to the spark plug of said one cylinder.

3. A device according to claim 1, characterized in that each cylinder has a spark plug, and said first sensor means includes a first ionization probe disposed in a zone very close to the spark plug.

4. Device according to claim 1, characterized in that the ignition system is of the type having control means for a basic regulation of the ignition advance and includes an electronic device coupled to said regulation device and said control means for modifying such basic ignition advance regulation in response to commands it receives from the regulation device.

5. Device according to claim 1, characterized in that the ignition system is of the type having control means for a basic regulation of the ignition advance of an electromechanical type, an electromechanical device coupled to said regulation device and said control means for modifying said basic ignition advance regulation in response to the commands it receives from the regulation device.

6. Device according to claim 1, characterized in that said electronic circuit includes means wherein said value K with which the ratio $\alpha/\beta$ is compared, is preselected as a function of at least one of the characteristic parameters of the mode of use of the engine.

7. Device according to claim 1, characterized in that said electronic circuit comprises a first constant-frequency pulse generator, a first count-up and count-down counter operatively connected to said first constant-frequency pulse generator, a second constant-frequency pulse generator, a second count-up and count-down counter operative connected to said second constant-frequency pulse generator, a count-up input of said first counter being connected to said first sensor means for receiving the signal of ignition start of the mixture of at least said one cylinder to cause said first counter to start its constant-frequency pulse count, said first counter also being connected to said second sensor means for receiving the signal which defines the instant of time at which the piston of the one cylinder is at is top dead center for commanding said first counter to stop counting its constant-frequency pulse, a count-up input of said second counter being connected to said second sensor means for receiving the same signal which defines the instant of time at which the piston of said one cylinder is at its top dead center for causing the second counter to start counting its constant-frequency pulses and said second counter being connected to said third sensor means for receiving the signal of end of combustion and for commanding the second counter to stop counting its constant-frequency pulse, the number of pulses summed up by the first counter representing said angle $\alpha$, the number of pulses summed up by the second counter representing the angle $\beta$, said third sensor means also being connected to a count-down input of the first counter and a count-down input of the second counter for delivering thereto the signal of end of mixture combustion and for commanding the counters to count-down until resetting, said counters being operatively connected to respective logical gates at the outputs of which the signals appear which indicate the condition of resetting of at least the respective counter with the presence of the resetting signal on one only of the outputs of the logical gates indicating that the $\alpha/\beta$ ratio is lesser or greater than the pre-established value K and the simultaneous presence of the of the resetting signal on both outputs of the logical gates indicating that the angle $\alpha$ is equal to the angle $\beta$ and the $\alpha/\beta$ ratio is equal to the pre-established value K.

* * * * *